United States Patent [19]
Kanno et al.

[11] Patent Number: 5,526,188
[45] Date of Patent: Jun. 11, 1996

[54] ZOOM LENS BARREL

[75] Inventors: Hideo Kanno, Chiba; Hideshi Naito, Tokyo, both of Japan

[73] Assignee: Nikon Corporation, Tokyo, Japan

[21] Appl. No.: 352,788

[22] Filed: Dec. 1, 1994

Related U.S. Application Data

[63] Continuation of Ser. No. 203,511, Feb. 28, 1994, abandoned, which is a continuation of Ser. No. 76,698, Jun. 15, 1993, abandoned, which is a continuation of Ser. No. 829,318, Feb. 3, 1992, abandoned.

[30] Foreign Application Priority Data

Feb. 14, 1991 [JP] Japan ................................. 3-12038
Feb. 14, 1991 [JP] Japan ................................. 3-40692
May 21, 1991 [JP] Japan ................................. 3-115917

[51] Int. Cl.$^6$ ........................................... G02B 13/08
[52] U.S. Cl. ...................... 359/698; 359/695; 359/700; 359/824; 354/195.12
[58] Field of Search ............................ 359/694, 695, 359/696, 698, 699, 700, 823, 824; 354/286, 195.12

[56] References Cited

U.S. PATENT DOCUMENTS 4,286,845  9/1981  Kamata ................................. 359/699
4,416,513  11/1983  Uesugi ................................. 359/824
4,749,269  6/1988  Nakashima et al. ................... 359/696

FOREIGN PATENT DOCUMENTS 59-101608  6/1984  Japan.
61-86718   5/1986  Japan.

OTHER PUBLICATIONS

Patent abstracts of Japan, vol. 10, No. 260 (P-494) Sep. 5, 1986.

*Primary Examiner*—Georgia Y. Epps
*Assistant Examiner*—Thomas Robbins

[57] ABSTRACT

There is disclosed a zoom lens barrel of inner focusing type, simplified in structure by the use of a surface wave motor. There are provided two biasing members of different biasing forces, in such a manner that the stator member of the surface wave motor can rotate with respect to the fixed tube member and the movable member of the surface wave motor rotates integrally with the stator member in the zooming operation. Such structure allows to dispense with a mechanical clutch for selecting the focusing or zooming operation.

12 Claims, 5 Drawing Sheets

ZOOM LENS BARREL

This is a continuation of application Ser. No. 08/203,511, filed Feb. 28, 1994, which is a continuation of application Ser. No. 08/076,698, filed Jun. 15, 1993, which is a continuation of application Ser. No. 07/829,318, filed Feb. 3, 1992, all now abandoned.

BACKGROUND OF THE INVENTION

1. Field of the Invention

The present invention relates to a zoom lens barrel, and more particularly to a zoom lens barrel employing a surface wave motor as the drive source for power zooming or automatic focusing of a phototaking lens.

2. Related Background Art

In the field of zoom lens barrels, those employing the first lens group for focusing are being replaced, in recent years, by compact barrels of rear focusing system employing a rear lens group for focusing or inner focusing system employing an inner lens group for focusing. In these zoom lens barrels of a type utilizing a part of the zooming cam for focusing, there is incorporated a switching clutch for selecting the focusing or zooming operation.

Such conventional zoom lens barrels utilizing a part of the zooming cam for focusing have been associated with drawbacks that the barrel is complex in mechanism and is inevitably large in dimension, because of the presence of the switching clutch for the focusing and zooming operations. Also such barrels are not satisfactory in the convenience of use.

Also the recent zoom lens barrels frequently employ electrically powered zooming, which can be switched to manual zooming for fine adjustment. For this purpose there is incorporated a switching clutch for the power zooming and the manual zooming.

Because of the presence of such switching clutch for the power zooming and the manual zooming, such barrels are complex in mechanism and are not satisfactory in the convenience of use.

Furthermore, in a lens barrel which uses a surface wave motor, the rotor (movable member) and a stator (fixed member) are brought into contact with each other with large force at their contact surfaces because of the principle of the rotation of the surface wave motor. Therefore, the rotor must be rotated by the torque which is larger than the frictional force generated between the rotor and the stator in order to manually drive the photographing lens. As a method of manually driving the photographing lens with small force, a method disclosed in Japanese Patent Appln. Laid-Open No. 59-101608 has been known which is arranged in such a manner that the frictional force generated between the rotor and the stator is reduced. Another method has been known which is arranged in such a manner that the rotor and the stator are moved away from each other.

However, in the above-described methods, the rotor, which is positioned in contact with the stator in a frictional manner although the frictional force is not large, is rotated. Therefore, a problem arises in that the contact surface of the rotor and that of the stator wear out excessively. Furthermore, dust will be introduced into the space between the rotor and the stator because they are arranged to move away from each other, causing another problem to arise in that the contact surfaces to be damaged when the surface wave motor is rotated.

In order to overcome the above-described problems, a method has been disclosed in Japanese Patent Appln. Laid-Open No. 61-86718 which is arranged in such a manner that, when the mode selection device is in the manual focal point adjustment mode, the movable member and the fixed member of the surface wave motor are integrated before they are rotated in synchronization with the operation of the manual operation member so as to drive the photographing lens. Furthermore, in the automatic focal point adjustment mode, the fixed member is fixed to the lens barrel so as to drive the photographing lens when the movable member is rotated. According to the above-described method, the photographing lens can be driven while protecting the contact surface of the movable member and that of the fixed member from damage.

However, the method disclosed in Japanese Patent Appln. Laid-Open No. 61-86718 is arranged in such a manner that the mode selection device is slid so that frictional force is generated between the surface of the outer tube of the surface wave motor and that of the fixed tube in order to prevent the rotation of the surface wave motor in the fixed tube even if the lens holding tube is driven by the surface wave motor in the automatic focal point adjustment mode. In the manual focal point adjustment mode, the mode selection device is slid in the opposite direction so as to make the frictional force generated between the surface of the manual movement ring and the surface of the outer tube to be larger than the force for driving the lens holding tube.

In order to achieve the above-described function switching operation, the mechanism becomes too complicated because mechanical mode selection switching is performed. Furthermore, a mechanical switching mechanism must be used in a case where a so-called go-home photographing function is performed in which an arbitrary range of photography is previously stored and the lens is driven to the stored range of photography after a photographing operation has been completed at another range of photography or a so-called manual focal point adjustment mode priority photography is performed in which instantaneous switching to the manual focal point adjustment mode is realized by rotating the manual operation ring during photographing in the automatic focal point adjustment mode. Therefore, it is very difficult to include the mechanism of quickly performing switching of the above-described functions.

SUMMARY OF THE INVENTION

In consideration of the foregoing, the object of the present invention is to provide a zoom lens barrel of inner focusing system of simpler structure and improved convenience of use, utilizing a surface wave motor.

The above-mentioned object can be attained, according to the present invention, by a zoom lens barrel provided with a first optical system or a first lens group involved only in zooming; a second optical system or a second lens group involved in zooming and focusing; a fixed tube member (1); a first support tube member (2) supporting the first lens group and axially movably fitting with the fixed tube member (1); a second support tube member (3, 4) supporting the second lens group and axially movably fitting with the fixed tube member (1); a zooming operation ring (7) for effecting a zooming operation; a cam ring (10) to be rotated about the optical axis by the operation of the zooming operation ring (7) to axially displace the first support tube member (2); a focusing ring (11) constituting a movable member of a surface wave motor, to be rotated about the optical axis by the operation of the zooming operation ring (7) to axially displace the second support tube member (3, 4) and also to be rotated by a focusing motor to axially displace the second support tube member (3, 4); and a stator member (5) of the surface wave motor, fitted with the fixed tube member (1) and rotating the focusing ring (11) at the focusing operation, comprising an engaging part (5a, 7b) for integrally rotating the zooming operation ring (7) and the surface wave motor stator member (5); a first biasing member (6) for pressing the stator member (5) to the fixed tube member (1); and a second biasing member (15) for pressing the focusing ring (11) to the stator member (5), wherein the biasing forces of the first biasing member (6) and the second biasing member (15) are so selected that the frictional torque generated by the pressing of the stator member (5) to the fixed tube member (1) by the first biasing member (6) is larger than that generated by the pressing of the focusing ring (11) to the stator member (5) by the second biasing member (15).

Because of the difference in biasing force between two biasing members, the stator member of the surface wave motor is rendered rotatable with respect to the fixed tube member at the zooming operation, and the movable member of the surface wave motor rotates integrally with the stator member.

In the focusing operation, the stator member of the surface wave motor is fixed to the fixed tube member and is rendered incapable of rotation, and, upon receiving electric power supply, said stator member drives the movable member in rotating motion. The movable member integrally rotates with the focusing ring, thereby effecting the focusing operation.

There is not provided a switching clutch for the focusing and zooming operations.

Another object of the present invention is to provide a zoom lens barrel which is simpler in mechanism and improved in the convenience of use, capable of switching the power zooming the manual zooming operations by means of a surface wave motor.

The above-mentioned object can be attained, according to the present invention, by a power zoom lens barrel provided with a zooming optical system or zooming lenses (L11, L12); a fixed tube member (21); a lens support tube member for supporting the zooming lenses (L11, L12); a zooming operation ring (27) for manual zooming operation; a switching device (23) for selecting manual zooming operation or power zooming operation; a cam ring (30) to be rotated about the optical axis by the zooming operation to axially displace the lens support tube member (22); and a surface wave motor including a stator member (25) fitted with the fixed tube member (21) and a movable member (31) positioned in contact with the stator member (25) and rendered rotatable about the optical axis, wherein the stator member (25) of the surface wave motor engages with the zooming operation ring (27) so as to be integrally rotatable therewith about the optical axis; the cam ring (30) engages with the movable member (31) of the surface wave motor so as to be integrally rotatable therewith about the optical axis; the lens barrel comprises a first biasing member (26) for axially pressing the stator member (25) to the fixed tube member (21) and a second biasing member (35) for axially pressing the movable member to the stator member (25); and the biasing forces of the first and second biasing members (26, 35) are so selected that the frictional torque generated by the pressing of the stator member (25) to the fixed tube member (21) by the first biasing member (26) is larger than that generated by the pressing of the movable member (31) to the stator member (25) by the second biasing member (35).

Also there is provided a power zoom lens barrel in which the cam ring 30 and the movable member of the surface wave motor are integrally formed, instead of mutual engagement thereof so as to be integrally rotatable about the optical axis.

Because of the difference in biasing force of two biasing members, the stator member of the surface wave motor is rendered rotatable with respect to the fixed tube member in the manual zooming operation, and the movable member integrally rotates with the stator member to effect the zooming operation.

In the power zooming operation, the stator member of the surface wave motor is fixed to the fixed tube member and is rendered incapable of rotation, and, upon receiving electric power supply, the stator member drives the movable member in rotation. The movable member integrally rotates the cam ring to effect the zooming operation.

The switching of power and manual zooming operations is conducted electrically.

An object of the present invention to provide a lens barrel which employs a surface wave motor which does not damage the contact surface of the movable member and that of the fixed member when the photographing lens is manually driven. Another object of the present invention is to provide a lens barrel capable of quickly changing the go-home photographing function and the manual focal point adjustment priority photographing.

According to the present invention, there is provided a lens barrel comprising:

a surface wave motor having a fixed member 106 capable of generating surface waves and a movable member 109 which comes in contact with the fixed member in a frictional manner and which is able to rotate while making the optical axis to be the center of the rotation by the surface waves;

a power source device which brings the surface wave motor to be capable of rotating;

photographing optical systems (L22 and L23);

a manual operating device 110 which can be operated from outside and which is capable of driving the photographing optical system; and a mode selection device 120 which can be operated from outside and which is capable of selecting an automatic adjustment mode in which the photographing optical system is, by the operation, driven by the surface wave motor or a manual adjustment mode in which the photographing optical system is, by the manual operation, driven by the manual operating device, wherein the mode selection device 120 generates an electric signal due to the outside operation and selects the manual focal point adjustment mode when an electric signal denoting the manual focal point adjustment mode is generated by the mode selection device 120 so that the manual operating device 110 and the fixed member 106 are brought into a state where they can be always integrally rotated and as well as power supply from the power source device to the surface wave motor is stopped to realize a state where the movable member 109 and the fixed member 106 of the surface wave motor can be integrally rotated due to their frictional force, When an electric signal denoting the automatic focal point adjustment mode is generated by the mode selection device 120, the automatic focal point adjustment mode is selected so that the power supply from the power source device to the surface wave motor is performed to realize a state where the movable member 109 can be rotated by the surface wave of the fixed member 106.

The lens barrel according to the present invention is arranged in such a manner that the fixed member of the surface wave motor and the manual operating member are connected in such a manner that they are able to integrally rotated with respect to the fixed tube of the lens barrel. Furthermore, only the electric switch is employed as the mode selection device. Thus, when the manual focal point adjustment mode is selected by the mode selection device, the movable member and the fixed member of the surface wave motor are integrated and rotated in synchronization with the manual operation of the manual operating member. As a result, the photographing optical system is driven. When the automatic focal point adjustment mode is selected, the fixed member is fixed to the lens barrel. Furthermore, the photographing optical system is moved when the movable member is rotated. Therefore, the photographing optical system can be driven while protecting the contact surface of the movable member and that of the fixed member of the surface wave motor from damage in the manual focal point adjustment mode. Therefore, the switching operation of, for example, the go-home photographing function or the manual focal point adjustment mode priority photographing operation can be performed by means of only the electric switch. Therefore, the mechanism of quickly performing switching of the above-described functions or modes can be included in the subject apparatus.

DESCRIPTION OF THE PREFERRED EMBODIMENTS

Figure 1:
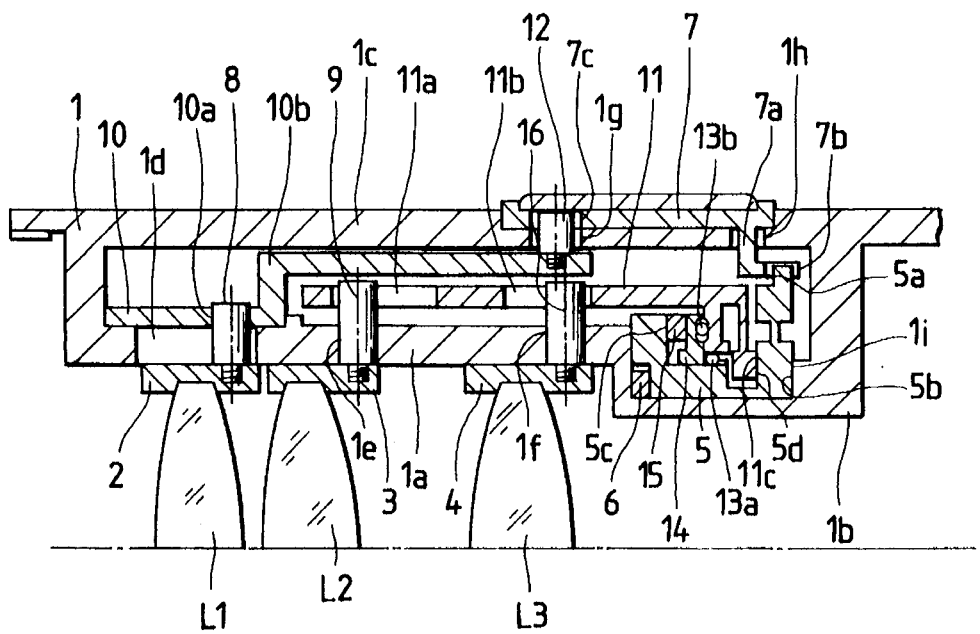
FIG. 1 is a cross-sectional view of an embodiment of the present invention.
Figure 2:
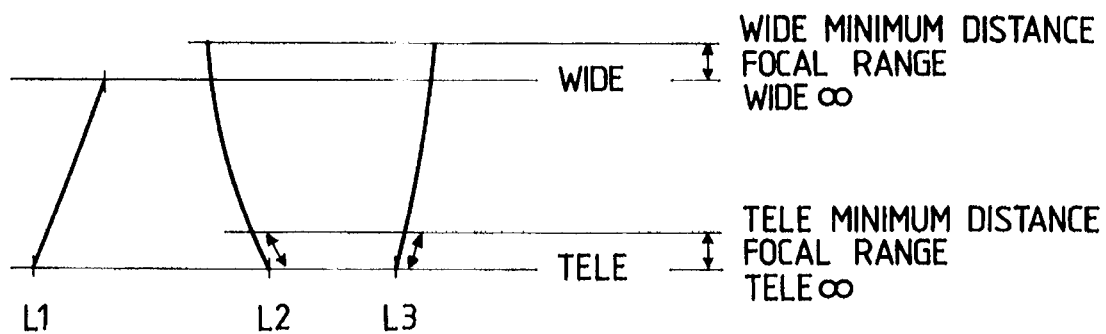
FIG. 2 is a schematic view showing movements of lens groups in the zooming and focusing operations.

Now the present invention-will be clarified in detail by an embodiment thereof shown in FIGS. 1 and 2, which are respectively a cross-sectional view and a schematic view showing movements of lens groups in the zooming and focusing operation.

The optical system is composed of a first lens group L1 for zooming only, a second lens group L2 for zooming and focusing, and a third lens group L3 for zooming and focusing.

As shown in FIG. 2, in a zooming operation, the first, second and third lens groups move respectively by predetermined amounts along the optical axis. In a focusing operation, only the second and third lens groups move by predetermined amounts, respectively along cams 1e, 1f, along the optical axis.

A fixed tube member 1 supports, by engagement, at the internal periphery of a smaller diameter portion 1a thereof, a first lens support tube 2 fixedly supporting the first lens group L1, a second lens support tube 3 fixedly supporting the second lens group L2, and a third lens support tube 4 fixedly supporting the third lens group L3.

A stator member 5 of a surface wave motor is fitted, rotatably about the optical axis, on the external periphery of a smallest diameter portion 1b of the fixed tube member 1, and is given a predetermined load torque by the biasing force of an ondular plate spring 6 to axially bias a contact face 5b of the stator member 5 to a contact face 1i of the fixed tube member 1.

A zoom ring 7 is fitted, rotatably about the optical axis and only over a predetermined angular range, on the external periphery of a large diameter portion 1c of the fixed tube member 1, and is rendered rotatable integrally with the stator member 5, because a groove 7b provided in a projection 7a extending from the zoom ring 7 perpendicularly to the optical axis engages with a projection 5a formed on the external periphery of the stator member 5 of the surface wave motor.

On the external periphery of the first lens support tube 2, there is mounted a pin 8 which penetrates through a guide groove 1d formed parallel to the optical axis on the fixed tube member 1 and engages at the end with a cam groove 10a of a cam ring 10 fitted on the external periphery of the smaller diameter portion 1a of the fixed tube member 1.

On the external periphery of the second lens support tube 3, there is mounted a pin 9 which penetrates through a cam groove 1e formed on the fixed tube member 1 and engages at the end with a guide groove 11a formed parallel to the optical axis on a movable member 11 to be explained later. Similarly, on the external periphery of the third lens support tube 4 there is mounted a pin 16, which penetrates through a cam groove 1f formed on the fixed tube member 1 and engages at the end with a guide groove 11b formed parallel to the optical axis on the movable member (focusing ring) 11 to be explained later.

The cam ring 10 is fitted and supported on the external periphery of the smaller diameter portion 1a of the fixed tube member 1. The zoom ring 7 and the cam ring 10 rotate integrally about the optical axis, since a pin 12, mounted on the external periphery of a larger diameter portion 10b penetrates through a circumferential escape groove 1g formed in the larger diameter portion 1c of the fixed tube member 1 and engages, at the end portion, with a guide groove 7c formed, parallel to the optical axis, on the zoom ring 7.

The movable member 11 is rotatably supported by ball bearings 13a, 13b with respect to the stator member 5. The stator member 5 is U-shaped, sandwiching the movable member 11 in the axial direction. A biasing member 15 is provided in contact with a contact face 5c at the left in the drawing, thereby maintaining, through a disk 14 and ball bearings 13a, 13b, the movable member 11 in friction contact, at a contact face 11c thereof, with a contact face 5d at the right side of the stator member 5. Thus, when a surface wave motor consisting of the stator member 5, movable member 11, biasing member 14, disk 14 and ball bearings 13a, 13b is given a current by an unrepresented control mechanism, a surface travelling wave is generated in the stator member 5 to rotate the movable member 11.

The frictional torque generated between the stator member 5 and the fixed tube member 1 by the biasing force of the ondular plate spring 6 is designed larger than that generated between the movable member 11 and the stator member 5 by the biasing force of the biasing member 15.

In the following there will be explained the function of the present embodiment.

Zooming operation is achieved by rotation of the zooming ring 7. Since the pin 12 engages with the guide groove 7c, the cam ring 10 rotates integrally with the zooming ring 7. Since the pin 8, mounted on the external periphery of the first lens support tube 2 penetrates through the axially extended guide groove 1d formed on the fixed tube member 1 and engages with the cam groove 10a of the cam ring 10, said first lens support tube 2 linearly moves along the optical axis without rotation.

Also when the zooming ring 7 is rotated, since the groove 7b, provided in the projection 7a extending perpendicularly to the optical axis from the zooming ring 7, engages with the projection 5a formed on the external periphery of the stator member 5 of the surface wave motor, the stator member 5 integrally rotates with the zooming ring 7. The biasing member 15 is provided between the disk 14 and the stator member 5 to maintain the stator member 5 and the movable member 11 in friction contact across the disk 14 and the ball bearings 13a, 13b, whereby the rotation of the stator member 5 causes integral rotation of the movable member 11. As the pin 9, mounted on the external periphery of the second lens support tube 3, penetrates through the cam groove 1e formed on the fixed tube member 1 and engages with the axially extended guide groove 11a formed on the movable member 11, the second lens support tube 3 moves along the optical axis, while rotating along the cam groove 1e. Similarly, since the pin 16, mounted on the external periphery of the third lens support tube 4 penetrates through the cam groove 1f formed on the fixed tube member 1 and engages with the axially extended guide groove 11b formed on the movable member 11, the third lens support tube moves along the optical axis while rotating along the cam groove 1f. The zooming is thus conducted by the axial movements in the ranges shown in FIG. 2.

In the focusing operation, an unrepresented control mechanism supplies electric power to the surface wave motor consisting of the stator member 5, movable member 11, biasing member 15, disk 14 and ball bearings 13a, 13b, thereby generating a surface travelling wave on the stator member 5. Since the frictional torque with the fixed tube member generated by the biasing force of the ondular plate spring 6 is selected larger than the torque generated by the surface wave motor, the stator member 5 does not rotate and the movable member 11 alone is rotated. Since the pin 9, mounted on the external periphery of the second lens support tube 3, penetrates through the cam groove 1e provided on the fixed tube member 1 and engages with the axially extended guide groove 11a formed on the movable member 11, the rotation of the movable member 11 causes the second lens support tube 3 to move along the optical axis, while rotating along the cam groove 1e. Also since the pin 16, mounted on the external periphery of the third lens support tube 4, penetrates through the cam groove 1f formed on the fixed lens tube 1 and engages with the axially extended guide groove 11b formed on the movable member 11, the rotation of the movable member 11 causes the third lens support tube 4 to move along the optical axis, while rotating along the cam groove 1f. Thus the focusing is conducted by the axial movements shown in FIG. 2, with rotations in the focusing ranges shown therein. In this operation, the cam ring 10 is not rotated.

In the present embodiment, the movable member 11 is constructed as the cam member for moving the lense L2, L3, but it is naturally possible to construct the movable member and the cam member as separate components and to mutually engage these components so as to effect integral rotation.

As explained in the foregoing, in the zooming operation, the stator member 5 rotates in response to the rotation of the zooming ring 7, and the movable member 11 also rotates by frictional coupling, achieved by the biasing member 15, to the stator member 5 thereby achieving the desired zooming. On the other hand, in the focusing operation, the movable member 11 is rotated by the surface travelling wave generated by the stator member 5. In this state the stator member 5 is prevented from rotation by the function of the ondular plate spring 6, so that the zoom state of the lens is not at all affected.

Thus the rotation of the stator member of the surface wave motor, with respect to the fixed tube member, is enabled in the zooming operation but disabled in the focusing operation, owing to the difference in the biasing force of two biasing members, so that a mechanical clutch is not required for selecting the focusing or zooming operation. Consequently there is provided a zoom lens barrel that can achieve secure functions with a simple and compact structure and without noises generated by motor or clutch.

Figure 3:
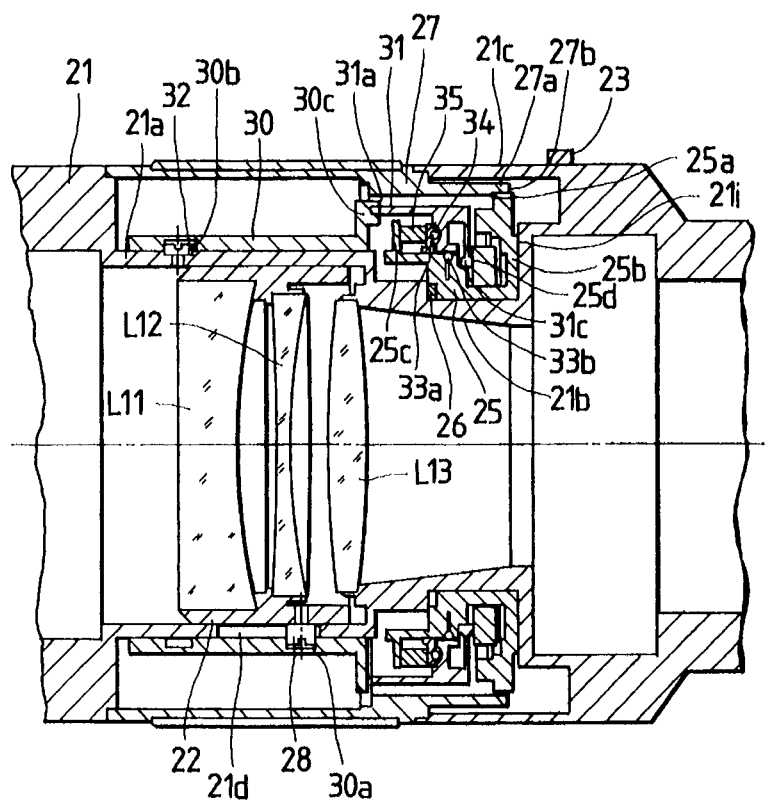
FIG. 3 is a cross-sectional view of a second embodiment.

In the following there will be explained a second embodiment of the present invention, with reference to a cross-sectional view shown in FIG. 3.

The optical system of the present embodiment is composed of a first lens group L11 and a second lens group L12 which effect the zooming operation, and a fixed third lens group L13.

A fixed tube member 21 supports, on the internal periphery of an intermediate diameter portion 21a thereof, a lens support tube 22 supporting the first and second lens groups L11, L12.

A stator member 25 of the surface wave motor is fitted, rotatably about the optical axis, on the external periphery of a smallest diameter portion 21b of the fixed tube member 21, and is given a predetermined load torque by the biasing force of an ondular plate spring 26, thereby axially pressing a contact face 25b of the stator member 25 toward a contact face 21i of the fixed tube member 21.

A manual zoom ring 27 is fitted, rotatably about the optical axis and over a predetermined angular range, on the external periphery of a large diameter portion 21c of the fixed tube member 21. The manual zoom ring 27 is so constructed as to integrally rotate with the stator member 25, since a groove 27b formed on a projection 27a extending, parallel to the optical axis, from the manual zoom ring 27 engages with a projection 25a provided on the external periphery of the stator member 25 of the surface wave motor.

The lens support tube 22 is provided, on the external periphery thereof, with a pin 28, which penetrates through an axially extended guide groove 21d formed on the fixed tube member 21 and engages, at the end portion, with a cam groove 30a of a cam ring 30 fitted on the external periphery of the intermediate diameter portion 21a of the fixed tube member 21. The cam ring 30 does not move in the axial direction but only rotates over a predetermined angular range, because a pin 32, mounted on the external periphery of the intermediate diameter portion 21a engages with a circumferential groove 30b formed on the internal periphery of the cam ring 30. Also the cam ring 30 is provided, at the right end thereof, with a projection 30c engaging with a groove 31a of a movable member 31 to be explained later, whereby the cam ring 30 and the movable member 31 integrally rotate about the optical axis.

Said movable member 31 is supported by ball bearings 33a, 33b rotatably with respect to the stator member 25, which is U-shaped, sandwiching the movable member 31 in the axial direction. A biasing member 35 is provided in contact with a contact face 25c at the left-hand side of the stator member 25, thereby maintaining a contact face 31c of the movable member 31 in friction contact with a contact face 25d at the right-hand side of the stator member 25, across a disk 34 and a ball bearing 33b. When the surface wave motor, consisting of the stator member 25, movable member 31, biasing member 35, disk 34 and ball bearings 33a, 33b, is powered by an unrepresented control mechanism, a surface travelling wave is generated on the stator member 25, thereby rotating the movable member 31.

The frictional torque generated between the stator member 25 and the fixed tube member 21 by the biasing force of the ondular plate spring 26 is selected larger than that generated between the movable member 31 and the stator member 25 by the biasing force of the biasing member 35.

A selector button 23 is provided for selecting the manual or power zooming operation.

In the following there will be explained the function of the present embodiment.

In the manual zooming mode, the electric power supply to the stator member 25 is disconnected by the selector button 23, and the manual zoom ring 27 is manually rotated. In response, the stator member 25 integrally rotates with the manual zoom ring 27, since the groove 27b in the axially extended projection 27a of the manual zoom ring 27 engages with the projection 25a formed on the external periphery of the stator member 25. As the biasing member 35 is provided between the disk 34 and the stator member 25 to maintain the stator member 25 and the movable member 31 in friction contact across the disk 34 and the ball bearings 33a, 33b, the movable member 31 rotates integrally with the stator member 25 when the latter is rotated. Also the cam ring 30 integrally rotates with the movable member 31, since the engaging groove 31a thereof engages with the projection 30c of the cam ring 30. Also since the pin 28, mounted on the external periphery of the lens support tube 22, penetrates through the axially extended guide groove 21d of the fixed tube member 21 and engages with the cam groove 30a of the cam ring 30, the lens support tube 22 moves in the axial direction, without rotation and along the cam groove 30a.

In the power zooming operation, the selector button 23 is actuated to supply the stator member 25 with electric power. When the surface wave motor, consisting of the stator member 25, movable member 31, biasing member 35, disk 34, and ball bearings 33a, 33b, is thus powered, a surface travelling wave is generated on the stator member 25. As the frictional torque with the fixed tube member 21, generated by the biasing force of the ondular plate spring 26, is selected larger than the torque generated by the surface wave motor, the stator member 25 does not rotate and the movable member 31 along is rotated. in response, the cam ring 30 integrally rotates, since the engaging groove 31a of the movable member 31 engages with the projection 30c of the cam ring 30. Since the pin 28, mounted on the external periphery of the lens support tube 22, penetrates through the axially extended guide groove 21d of the fixed tube member 21 and engages with the cam groove 30a formed on the cam ring 30, the lens support tube 22 moves in the axial direction along the cam groove 30a, without rotation, thereby achieving the power zooming operation.

Figure 4:
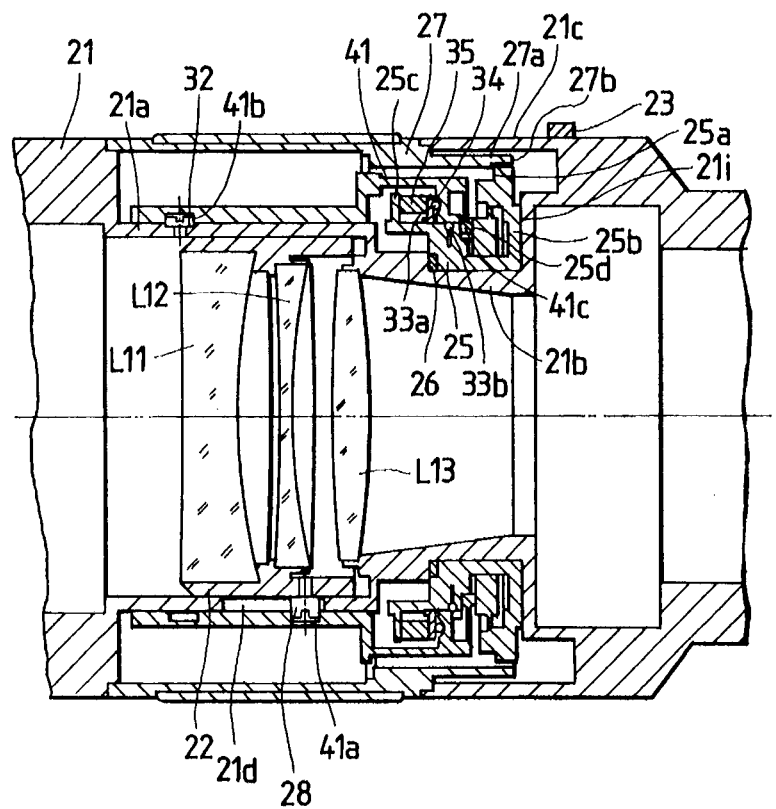
FIG. 4 is a cross-sectional view of a third embodiment.

In the following there will be explained a third embodiment, with reference to a cross-sectional view shown in FIG. 4, but in the following description there will be omitted structures same as or similar to those in the second embodiment. In contrast to the second embodiment in which the cam ring 30 and the movable member 31 are constructed as separate components, the third embodiment is featured by a fact that the cam ring 30 and movable member 31 are integrally constructed.

On the external periphery of a lens support tube 22, there is mounted a pin 28, which penetrates through an axially extended guide groove 21d provided on a fixed tube member 21 and engages, at the end portion, with a cam groove 41a of a movable member 41, fitted on the external periphery of an intermediate diameter portion 21a of said fixed tube member 21.

The movable member 41 does not move in the axial direction but rotates only in a predetermined angular range, since a pin 32, mounted on the external periphery of the intermediate diameter portion 21a, engages with a circumferential groove 41b formed on the internal periphery of the movable member 41. Also the movable member 41 is supported by ball bearings 33a, 33b, rotatably with respect to a stator member 25, which is U-shaped, sandwiching the movable member 41 in the axial direction. A biasing member 35 is provided in contact with a contact face 25c at the left-hand side, thereby maintaining a contact face 41c of the movable member 41 in friction contact with a contact face 25d at the right-hand side of the stator member 25, across a disk 34 and ball bearings 33a, 33b. Thus, when the surface wave motor, consisting of the stator member 25, movable member 41, biasing member 35, disk 34, and ball bearings 33a, 33b, is electrically powered by an unrepresented control device, a surface travelling wave is generated in the stator member 25, thereby rotating the movable member 41.

The frictional torque generated between the stator member 25 and the fixed tube member 21 by the biasing force of the ondular plate spring 26 is selected larger than that generated between the movable member 41 and the stator member 25 by the biasing force of the biasing member 35. In the following there will be explained the function of the present embodiment.

In the manual zooming mode, a selector button 23 is actuated to disconnect the electric power supply to the stator member 25, and a manual zoom ring 27 is manually rotated. In response, the stator member 25 rotates integrally with the manual zoom ring 27, since the groove 27b formed in the projection 27a axially extending from the manual zoom ring 27 engages with the projection 25a formed on the external periphery of the stator member 25. Since the biasing member 35 is provided between the disk 34 and the stator member 25 to maintain the stator member 25 in friction contact with the movable member 41 across the disk 34 and the ball bearings 33a, 33b, the movable member 41 rotates integrally with the stator member 25. Further, since the pin 28, mounted on the external periphery of the lens support tube 22, penetrates through the axially extended guide groove 21d of the fixed tube member 21 and engages with the cam groove 41a formed on the movable member 41, the lens support tube 22 moves in the axial direction along the cam groove 41a, without rotation.

In the power zooming mode, the selector button 23 is actuated to supply the stator member 25 with electric power. Thus, when the surface wave motor, consisting of the stator member 25, movable member 41, biasing member 35, disk 34 and ball bearings 33a, 33b, is electrically powered, a surface travelling wave is generated on the stator member 25. In response the stator member 25 does not rotate but the movable member 41 along rotates, since the frictional torque between the stator member 25 and the fixed tube member 21, generated by the biasing force of the ondular plate spring 26 is selected larger than the torque generated by the surface wave motor. Since the pin 28, mounted on the external periphery of the lens support tube 22, penetrates through the axially extended guide groove 21d of the fixed tube member 21 and engages with the cam groove 41a formed on the movable member 41, the lens support tube 22 moves in the axial direction along the cam groove 41a, without rotation, thereby effection the power zooming.

In the foregoing description, the selection of the power or manual zooming operation is effected by the selector button 23, but it is naturally possible to control the power supply, utilizing the rotation of the manual zoom ring as an electrical signal.

It is furthermore possible to select the power zooming and the manual zooming according to whether the electric power is supplied to the surface wave motor serving as the driving source for the power zooming. Thus such selection of operating mode does not require a clutch serving as a mechanical switch but can be achieved by an electrical switch.

As explained in the foregoing, in the manual zooming operation, the rotation of the zoom ring 27 causes the rotation of the rotary member 25, which in turn causes rotation of the movable member 31 which is friction coupled with the rotary member 25 by the biasing member 35, and the cam ring 30 engaging with the movable member 31 (in the 3rd embodiment, the rotation of the movable member 41 caused by the rotation of the stator member 25), thereby achieving desired zooming operation.

On the other hand, in the power zooming operation, the movable member 31 is rotated by the surface travelling wave generated by the rotary member 25. In this state, the rotary member 25 does not rotate with the movable member 31 by the function of the ondular spring 26, so that the manual zooming operation is not affected. More specifically, the coarse zooming can be achieved by power zooming, and the fine adjustment can be achieved by manual zooming. Since a mechanical clutch is not needed in these operations, the operator can smoothly proceed to the phototaking operation.

The rotation of the stator member of the surface wave motor with respect to the fixed tube member is electrically enabled in the manual zooming but disabled in the power zooming, due to the difference in the biasing force of two biasing members. There is thus provided a zoom lens barrel which is simple and compact structure, not requiring a mechanical clutch and free from noises of motor or clutch.

Then, a fourth embodiment in which the present invention is applied to an automatic focusing lens will now be described with reference to the drawings.

Figure 5:
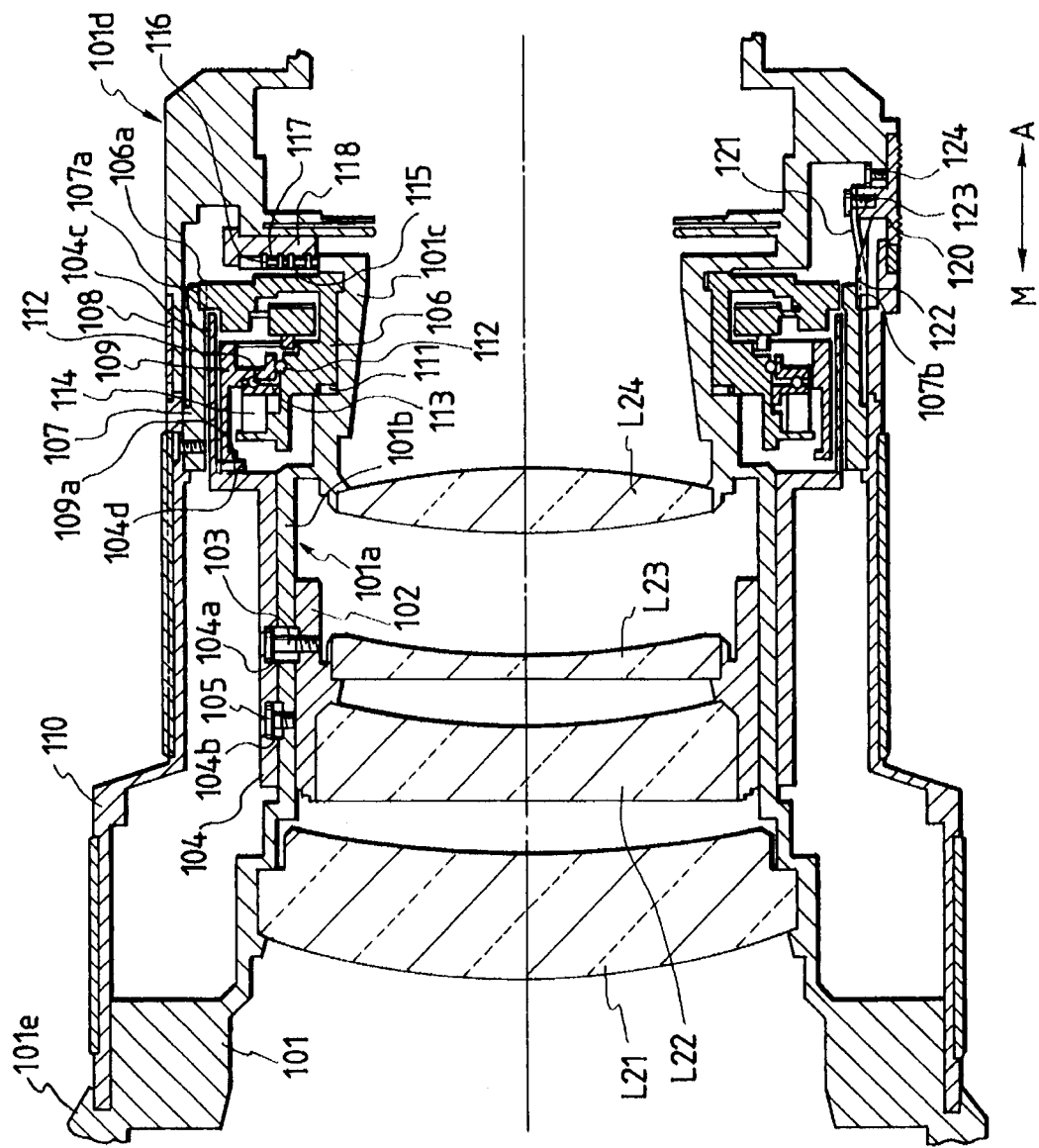
FIG. 5 is a cross sectional view which illustrates a fourth embodiment of the lens barrel according to the present invention.

FIG. 5 illustrates a state in which an automatic focal point adjustment mode is realized which is arranged in such a manner that focal point adjustment optical systems L22 and L23 are driven by the rotational force of a surface wave motor. In the above-described mode, a mode switch 120 is set to the automatic focal point adjustment mode.

Figure 6:
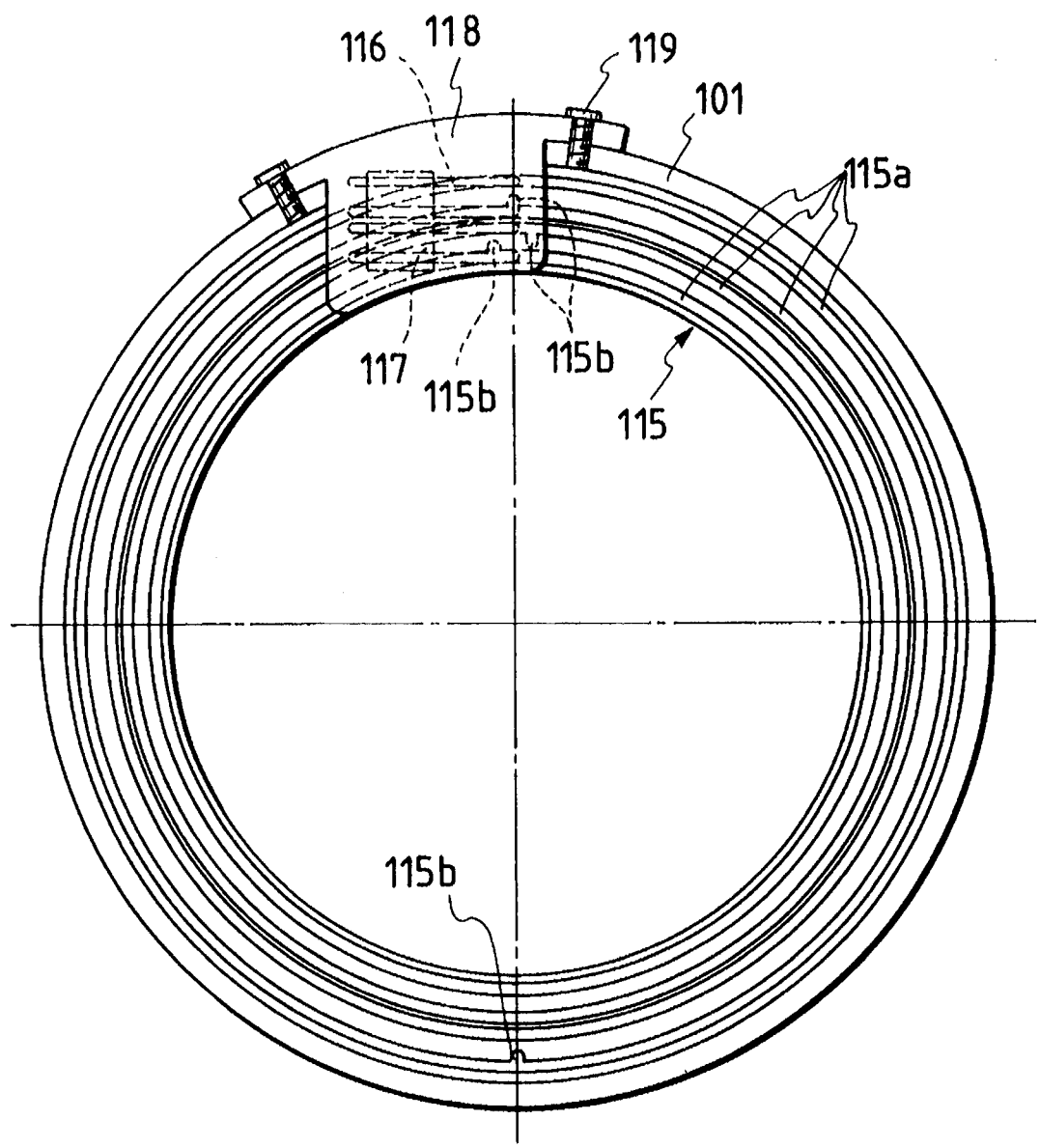
FIG. 6 is a horizontal cross sectional view which illustrates a power supply portion shown in FIG. 5.

Fixed lenses L22 and L23 serving as the focal point adjustment optical system and held by a lens holding tube 102 are moved in the direction of the optical axis so that the focal point adjustment is performed. At a central medium-diameter portion 101a of a fixed lens barrel 101, the lens holding tube 102 is disposed in such a manner that it is able to move in the direction of the optical axis. A pin 103 is erected on the outer surface of the lens holding tube 102, the pin 103 penetrating a guide groove formed in the central medium-diameter portion 101a and running parallel to the optical axis before it is engaged to a cam groove 104a formed in the inner surface of the cam ring 104. The cam ring 104 is engaged to the outer surface of the central medium-diameter portion 101a of the fixed lens barrel 101. Furthermore, a pin 105 erected on the outer surface of the central medium-diameter portion 101a is engaged to a circular groove 104b formed in the inner surface of the cam ring 104. Therefore, the cam ring 104 is fixed in the direction of the optical axis and as well as it is able to be rotated by a predetermined angle while making the optical axis to be its rotational center. Furthermore, a range scale is formed at the outer surface 104c of the large-diameter portion to the right of the cam ring 104. A stator 106 of the surface-wave motor is engaged to the outer surface of a central small-diameter portion 101c of the fixed lens barrel 101 in such a manner that the stator 106 is able to rotated around the optical axis. A fastening projection 106a is formed on the outer surface of the central small-diameter portion 101c, the fastening projection 106a being engaged to a fastening groove 107a formed in an intermediate ring 107 which is integrally fixed to a manual operating ring 110 and which is made of a transparent synthetic resin. A window member 108 is disposed in a large-diameter portion 101d of the fixed lens barrel 101 and as well as made of a transparent synthetic resin. The above-described window member 108 is used to read the range scale displayed on the outer surface 104c of the large-diameter portion to the right of the cam ring 104 in such a manner that the range scale is read through the intermediate ring 107 made of the transparent synthetic resin. A rotor 109 is positioned in contact with the stator 106 in a frictional manner, the rotor 109 being able to rotate with respect to the position of the stator 106 via bearing 112. A fastening groove 109a is formed to the left of the rotor 109 so as to be engaged to the fastening projection 104d formed in the inner surface of the large-diameter portion to the right of the cam ring 104. Therefore, the rotor 109 and the cam ring 104 are integrally rotated in terms of their rotational direction. The manual operating ring 110 is engaged to the large-diameter portion 101d and a left large-diameter portion 101e of the fixed lens barrel 101 in such a manner that the manual operating ring 110 is fixed in the direction of the optical axis and as well as it is able to rotate around the optical axis. An urging member 111 acts to give predetermined torque to the stator 106 in order to prevent easy rotation of the stator in the automatic focal point adjustment mode. An urging member 114 brings the stator 106 and the rotor 109 via a disc 113 in a frictional manner. A glass epoxy plate 115 is secured to the stator 106 in such a manner that the entire surface of its conductor portion 115a is placed on the ring as shown in FIG. 6. Therefore, an electrical connection to the stator 106 can be established regardless of the angular position of the stator 106 after the slide of a brush 116 on the above-described conducting portion 115a.

A through hole 115b is formed from the conductor portion 115a at a position offset from the ring member so that the conductor portion is connected to the reverse side of the glass epoxy plate 115, the conductor portion being electrically connected to the stator 106. A retaining plate 117 is used to secure the brush 116 to a brush fixing plate 118. The brush fixing plate 118 is secured to the fixed lens barrel 101 by a screw 119. A mode switch 120 is disposed in such a manner that it is able to slide so that, when it is slid in direction M of FIG. 5, the manual focal point adjustment mode is realized and the automatic focal point adjustment mode is realized when the same is slid in direction A. Simultaneously, it generates an electric signal which corresponds to each of the above-described modes. When the mode switch 120 is slid in the direction M, that is, in the manual focal point adjustment mode, a switch plate 121 secured to the mode switch 120 with a screw 123 is moved simultaneously. As a result, a leaf spring 122 secured to the fixed lens barrel 101 by a screw 124 is upwards pushed as designated by a dashed line of FIG. 5. As a result, the leaf spring 122 is separated from a plurality of the fastening grooves 107b formed in the outer surface of the intermediate ring 107. In the state where the fastening groove 107b formed in the intermediate ring 107 and the leaf spring 122 are separated from each other, the manual operating ring 110 is able to be rotated. When the mode switch 120, which is positioned in the manual focal point adjustment mode, is slid in the direction A, that is, in the automatic focal point adjustment mode, the switch plate 121 secured to the mode switch 120 with the spring 123 is simultaneously moved. As a result, the leaf spring 122 is returned to its original state as designated by a continuous line of FIG. 5. Therefore, the fastening groove 107b formed in the intermediate ring 107 and the leaf spring 122 are engaged to each other, causing the rotation of the manual operating ring 110 to be prevented.

Assuming that the frictional torque generated between the stator 106 and the rotor 109 is A, the frictional torque generated between the fixed lens barrel 101 and the stator 106 is B and the torque required to drive the lens holding tube 102 is C, relationship C<B<A is held.

Then, the operation according to this embodiment will now be described with reference to FIG. 5.

Figure 7:
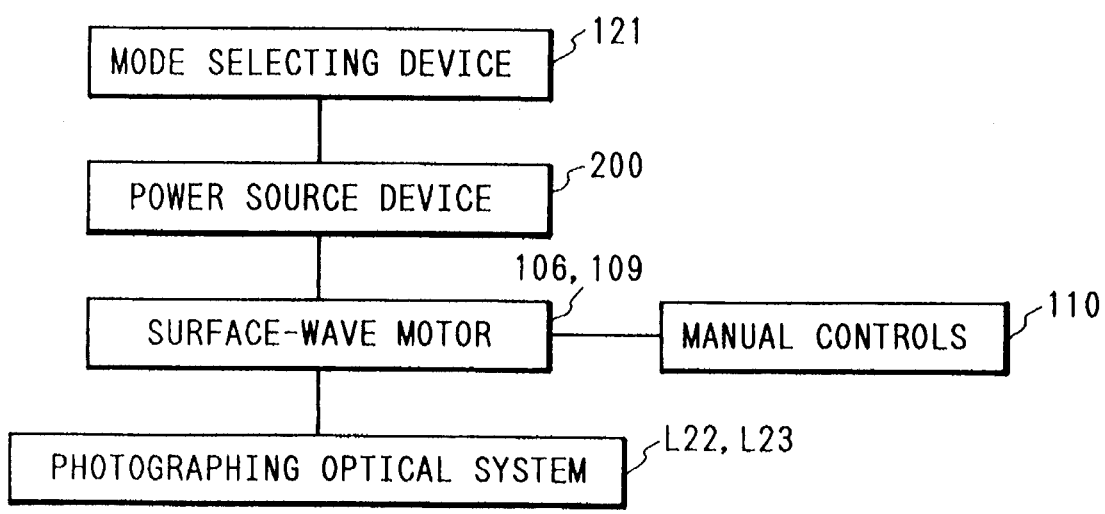
FIG. 7 is a schematic block diagram which illustrates the lens barrel.

FIG. 7 is a schematic block diagram which illustrates the lens barrel according to this embodiment.

AUTOMATIC FOCAL POINT ADJUSTMENT MODE

In the automatic focal point adjustment mode, the mode switch 120 is positioned at position A and as well as the fastening groove 107b formed in the intermediate ring 107 and the leaf spring 122 are fastened to each other as designated by the continuous line of FIG. 5. Therefore, the rotation of the manual operating ring 110 is prevented and as well as the stator has been brought into a state where it cannot be rotated. When power is supplied to the surface wave motor by a control mechanism (which corresponds to a power supply apparatus 200 shown in FIG. 7 and which is omitted from illustration), surface propagation wave is generated in the stator 106. As a result, the rotor 109 is rotated in the circumferential direction. When the rotor is rotated, the rotor 109 and the cam ring 104 are integrally rotated because the fastening groove 109a formed to the left of the rotor 109 and the fastening projection 104d formed on the cam ring 104 are engaged to each other. When the cam ring 104 is rotated, the lens holding tube 102 moves in the direction of the optical axis so that the automatic focal point adjustment is performed.

MANUAL FOCAL POINT ADJUSTMENT MODE

In the manual focal point adjustment mode, the mode switch 120 is slid in the direction M shown in FIG. 5. As a result, the power supply to the surface wave motor is stopped. When the mode switch 120 is slid in the direction M, the switch plate 121 secured to the mode switch 120 with the screw 123 is simultaneously moved. Therefore, as designated by the dashed line shown in FIG. 5, the switch plate 121 upwards push the leaf spring 122 secured to the fixed lens barrel 101 with the screw 124. As a result, the leaf spring 122 is separated from a plurality of the fastening grooves 107b formed in the outer surface of the intermediate ring 107. In the state where the fastening groove 107b formed in the intermediate ring 107 and the leaf spring 122 are separated from each other, the manual operating ring 110 is able to be rotated and as well as the power supply to the surface wave motor is stopped. Therefore, the surface wave motor is not rotated and thereby the stator 106 and the rotor 109 are strongly pressed by the urging member 114. Furthermore, frictional torque A generated between the stator 106 and the rotor 109 and torque C required to drive the lens holding tube 102 hold a relationship C<A. Therefore, when the manual operating ring 110 is rotated, the stator 106 and the rotor 109 are, via the intermediate ring 107, rotated integrally. When the rotor 109 is rotated, the rotor 109 and the cam ring 104 are integrally rotated because the fastening groove 109a formed to the left of the rotor 109 and the fastening projection 104d formed on the cam ring 104 are engaged to each other. When the cam ring 104 is therefore rotated, the lens holding tube 102 is moved in the direction of the optical axis so that the manual focal point adjustment is performed.

According to this embodiment, the mode switch 120 is positioned at position A in the automatic focal point adjustment mode. Furthermore, the fastening groove 107b formed in the intermediate ring 107 and the leaf spring 122 are engaged to each other. Therefore, the rotation of the manual operating ring 110 is prevented and as well as the rotation of the stator 106 is stopped. Even if the fastening groove 107b formed in the intermediate ring 107 and the leaf spring 22 are not engaged to each other, the stator 106 is not rotated because frictional torque generated between the fixed lens barrel 101 and the stator 106 and torque C required to drive the lens holding tube 102 hold the relationship C<B. Therefore, only the rotor 109 is rotated. That is, the automatic focal point adjustment mode and the manual focal point adjustment mode can easily be switched over depending upon whether or not power is supplied to the surface wave motor M.

Therefore, the necessity of performing the mechanical switching operation can be eliminated in a case where a so-called go-home photographing function is performed in which an arbitrary range of photography is previously stored and the lens is driven to the stored range of photography after a photographing operation has been completed at another range of photography or a so-called manual focal point adjustment mode priority photography is performed in which instantaneous switching to the manual focal point adjustment mode is realized by rotating the manual operation ring during photographing in the automatic focal point adjustment mode. Therefore, the mechanism of quickly performing switching of the above-described functions or modes can be included in the subject apparatus.

The lens barrel according to the present invention is arranged in such a manner that the stator of the surface wave motor and the manual operating device are connected in such a manner that they are able to integrally rotated with respect to the fixed tube of the lens barrel. Furthermore, only the electric switch is employed as the mode selection device. Thus, when the manual focal point adjustment mode is selected by the mode selection device, the movable member and the fixed member of the surface wave motor are integrated and rotated in synchronization with the manual operation of the manual operating member. As a result, the photographing optical system is driven. When the automatic focal point adjustment mode is selected, the fixed member is fixed to the lens barrel. Furthermore, the photographing optical system is moved when the movable member is rotated. Therefore, the photographing optical system can be driven while protecting the contact surface of the movable member and that of the fixed member of the surface wave motor from damage in the manual focal point adjustment mode. Therefore, the switching operation of, for example, the go-home photographing function or the manual focal point adjustment mode priority photographing operation can be performed by means of only the electric switch. Therefore, the mechanism of quickly performing switching of the above-described functions or modes can be included in the subject apparatus.

What is claimed is:

1. A zoom lens barrel comprising:

a first optical system involved only in zooming;

a second optical system involved in zooming and focusing;

a fixed tube member;

a first support tube, supporting said first optical system and fitted in said fixed tube member, movably in the direction of optical axis;

a second support tube, supporting said second optical system and fitted in said fixed tube member, movably in the direction of optical axis;

a zooming operation ring which effects a zooming operation;

a cam ring rotated about the optical axis in response to the operation of said zooming operation ring, thereby displacing said first support tube in the direction of optical axis;

a surface wave motor including a stator member fitted on said fixed tube member, and a movable member positioned in contact with said stator member and rotatably about the optical axis;

a focusing ring rotated about the optical axis by the operation of said zooming operation ring thereby displacing said second support tube in the direction of optical axis, and also rotated by said surface wave motor in a focusing operation thereby displacing said second support tube in the direction of optical axis;

a first biasing member which presses said stator member of the surface wave motor toward said fixed tube member, thereby maintaining said stator member in friction engagement with said fixed tube member; and a second biasing member which presses said movable member of the surface wave motor toward said stator member of the surface wave motor, thereby maintaining said movable member in friction engagement with said stator member;

wherein said stator member of the surface wave motor engages with said zooming operation ring so as to be integrally rotatable about the optical axis;

said focusing ring engages with said movable member of the surface wave motor so as to be integrally rotatable about the optical axis; and the biasing forces of said first and second biasing members are so selected that the frictional torque generated by the pressing of the stator member of the surface wave motor toward the fixed tube member by said first biasing member is larger than the frictional torque generated by the pressing of said movable member of the surface wave motor toward said stator member thereof by said second biasing member.

2. A zoom lens barrel according to claim 1, wherein said focusing ring and said movable member of the surface wave motor are integrally formed.

3. A zoom lens barrel comprising:

a zooming lens;

a fixed tube member;

a lens support tube supporting said zooming lens;

a zooming operation ring which effects a manual zooming operation;

a cam ring rotated about the optical axis by the zooming operation, thereby displacing said lens support tube in the direction of optical axis;

a surface wave motor including a stator member fitted on said fixed tube member, and a movable member positioned in contact with said stator member and said cam ring and rotatable about the optical axis;

selector means for electrically selecting one of a manual zooming operation and a power zooming operation by supplying power to said surface wave motor to select the power zooming operation;

a first biasing member which presses said stator member of the surface wave motor toward said fixed tube member, thereby maintaining said stator member in frictional engagement with said fixed tube member; and a second biasing member which presses said movable member of the surface wave motor toward said stator member thereof, thereby maintaining said movable member in frictional engagement with said stator member;

wherein in the manual zooming operation said stator member of the surface wave motor engages with said zooming operation ring and integrally rotates about the optical axis;

said cam ring engages with said movable member of the surface wave motor so as to be integrally rotatable about the optical axis; and the biasing forces of said first and second biasing members are so selected that the frictional torque generated by the pressing of said stator member of the surface wave motor toward the fixed tube member by said first biasing member is larger than the frictional torque generated by the pressing of said movable member of the surface wave motor toward said stator member thereof by said second biasing member such that in the power zooming operation said stator member of the surface wave motor remains stationary and transmits a wave to rotate said movable member of said surface wave motor.

4. A zoom lens barrel according to claim 3, wherein said cam ring and said movable member of the surface wave motor are integrally formed.

5. A zoom lens barrel according to claim 3, wherein said stator member of said surface wave motor always engages with said zooming operation ring so that said stator member and said zooming operation ring rotate about the optical axis in unison.

6. A zoom lens barrel according to claim 3, wherein said zooming operation ring is inhibited from rotating when said power zooming apparatus is selected by said selector means.

7. A zoom lens barrel according to claim 3, wherein said cam ring is provided with a range scale on an outer surface thereof, and wherein said fixed tube member has a resin portion of which a portion is transparent so that said range scale is seen through said resin portion from the outside.

8. A lens barrel comprising:

a surface wave motor having a fixed member capable of generating surface waves and a movable member which comes in contact with said fixed member in a frictional manner and which is able to rotate while making the optical axis to be the center of the rotation by said surface waves;

power source means which brings said surface wave motor to be capable of rotating;

a photographing optical system;

a fixed lens barrel which holds said photographing optical system;

said fixed member being held by said fixed lens barrel in such a manner that it is able to rotate around said optical axis and said movable member drives said photographing optical system in the direction of said optical axis by the rotation of said movable member;

a manual operating ring which can be operated from outside and which can be rotated around said optical axis together with said fixed member;

mode selection means which can be operated from outside and which is capable of selecting an automatic adjustment mode in which said photographing optical system is driven by said surface wave motor or a manual adjustment mode in which said photographing optical system is driven by said manual operating ring, wherein said mode selection means generates and supplies, to said power source means, an electric signal with which power supply from said power source means to said surface wave motor is stopped when said manual adjustment mode is selected so that said movable member and said fixed member of said surface wave motor are brought to a state in which they can be integrally rotated by the frictional force between said movable member and said fixed member of said surface wave motor and as well as generates and supplies, to said power source means an electric signal with which the power supply from said power source means to said surface wave motor is performed so that said movable member is brought into a state in which said movable member can be rotated by said surface waves of said fixed member when said automatic adjustment mode is selected.

9. A lens barrel according to claim 8, wherein said mode selection means includes means which fixes said manual operating ring to said fixed lens barrel in order to prevent the rotation of said manual operating ring when said automatic adjustment mode is selected.

10. A lens barrel according to claim 8 further comprising:

a conductor portion formed annularly around said optical axis in said fixed member and brush means provided for said fixed lens barrel and sliding on said conductor portion so as to be capable of establishing an electrical connection between said power source means and said fixed member regardless of the angular position of said fixed member.

11. A lens barrel according to claim 8, wherein said movable member has a range scale formed on the outer surface thereof and an intermediate ring made of a transparent resin and said fixed lens barrel has a window from which said range scale can be read from an outside portion via the transparent portion of said intermediate ring.

12. A lens barrel according to claim 8, wherein the following relationship is held:

$$C < B < A$$

where

A denotes the frictional torque generated between said fixed member and said movable member, B denotes the frictional torque generated between said fixed lens barrel and said fixed member, and C denotes torque required to drive said photographing optical system.

* * * * *